United States Patent
Nosov et al.

(10) Patent No.: US 11,494,468 B2
(45) Date of Patent: Nov. 8, 2022

(54) RIGHTS MANAGEMENT OF CLOUD RESOURCES

(71) Applicant: Microsoft Technology Licensing, LLC, Redmond, WA (US)

(72) Inventors: Alexander E. Nosov, Bellevue, WA (US); Yashesvi Sharma, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 474 days.

(21) Appl. No.: 16/663,575

(22) Filed: Oct. 25, 2019

(65) Prior Publication Data

US 2021/0034715 A1 Feb. 4, 2021

Related U.S. Application Data

(60) Provisional application No. 62/881,937, filed on Aug. 1, 2019.

(51) Int. Cl.
| | |
|---|---|
| *G06F 21/10* | (2013.01) |
| *G06Q 20/10* | (2012.01) |
| *H04L 41/50* | (2022.01) |

(52) U.S. Cl.
CPC ......... *G06F 21/105* (2013.01); *G06Q 20/102* (2013.01); *H04L 41/5096* (2013.01)

(58) Field of Classification Search
CPC .................................................. G06F 21/105
See application file for complete search history.

(56) References Cited

U.S. PATENT DOCUMENTS

| | | | |
|---|---|---|---|
| 2013/0262250 A1 | 10/2013 | Lingafelt et al. | |
| 2014/0289412 A1* | 9/2014 | Doddavula | H04L 67/322 709/226 |

(Continued)

FOREIGN PATENT DOCUMENTS

| | | |
|---|---|---|
| WO | 2015087444 A1 | 6/2015 |
| WO | 2016089484 A1 | 6/2016 |

OTHER PUBLICATIONS

"ANSYS Cloud Solutions", Retrieved from: https://www.ansys.eom/-/media/ansys/en-gb/presentations/2017+customer+day+presentations/ansys-cd-2017-ansys-cloud-solutions-customer-facing.pdf?la=en-GB, May 19, 2017, 16 Pages.

(Continued)

*Primary Examiner* — James D Nigh
*Assistant Examiner* — Nicholas K Phan
(74) *Attorney, Agent, or Firm* — Fiala & Weaver P.L.L.C.

(57) ABSTRACT

A system and method include association of a first plurality of software licenses of a first type with a first subscription associated with a first plurality of cloud-based resources, determination of a first number of the first plurality of software licenses to activate based on the types of the first plurality of resources, activation of the first number of the first plurality of software licenses, monitoring of usage of the first plurality of resources, determination, based on the monitored usage, of a second one or more resources to associate with the first subscription, determination, in response to determining the second resources, of a second number of the first plurality of software licenses to activate based on the types of the second one or more resources, activation of the second number of the first plurality of software licenses, and association of the second resources with the first subscription.

14 Claims, 8 Drawing Sheets

(56) References Cited

U.S. PATENT DOCUMENTS

| | | |
|---|---|---|
| 2015/0242600 A1 | 8/2015 | Ferris et al. |
| 2016/0162666 A1* | 6/2016 | Casey ................. G06F 9/45558 726/29 |
| 2018/0007127 A1* | 1/2018 | Salapura ............... H04L 47/783 |
| 2019/0042649 A1 | 2/2019 | Meau et al. |

OTHER PUBLICATIONS

"International Search Report and Written Opinion Issued in PCT Application No. PCT/US2020/036539", dated Sep. 17, 2020, 12 Pages.

* cited by examiner

FIG. 4

License Reservations

+ Create
Resource Groups
App Services
SQL Databases
Virtual Machines
Storage Accounts
Licenses Description  Type  Quantity  Elastic?  Expiration Register Current

RIGHTS MANAGEMENT OF CLOUD RESOURCES

CROSS-REFERENCE TO RELATED APPLICATIONS

The present application claims priority to U.S. Provisional Patent Application No. 62/881,937, filed Aug. 1, 2019, the contents of which are incorporated herein by reference for all purposes.

BACKGROUND

Cloud-based computing deployments present rights-management issues which are not present in a typical on-premise computing deployment. For example, in an on-premise deployment, system resources which require licenses (e.g., operating systems, database management systems) are substantially fixed and the licenses are purchased along with the resources. If a resource is added to the on-premise deployment, a corresponding license is purchased therewith. The on-premise customer maintains the licenses in order to ensure legal compliance and to provide documentary evidence of such compliance if audited by one or more resource providers.

Cloud-based deployments, by their nature, typically provide resource elasticity. For example, a cloud-based deployment may allow dynamic and possibly temporary increases to the compute size of a customer's deployment due to an increased business demand. Such an increase may require the customer to acquire additional licenses in order to remain in compliance. Current systems for acquiring additional licenses are cumbersome and lack any centralized management. Alternatively, the customer may simply purchase extra licenses in the conventional manner to maintain a buffer of usable licenses in case additional licenses are eventually needed. Such a buffer is not cost-efficient, may eventually be exhausted (requiring further additional licenses), and fails to address the issue of centralized license management.

Some cloud platforms offer Bring Your Own License (BYOL) benefits to facilitate migration to the cloud. These benefits provide a full or partial credit for previously-purchased on-premise licenses with respect to resources deployed in the cloud such as, but not limited to, an SQL managed instance, an SQL database, and an SQL Virtual Machine. In order to apply this benefit, the customer typically self-reports the existence of an on-premise license corresponding to the resource to be deployed in the cloud. The BYOL approach fails to address resource elasticity as described above. Moreover, records of the self-reported licenses are typically scattered across many resources in different customer subscriptions, which hinders compliance reporting. The users responsible for deploying the cloud resources and confirming the licenses' existence often cannot access applicable enterprise agreements and the licensing details therein, possibly resulting in inadvertent violation of licensing requirements.

BRIEF DESCRIPTION OF THE DRAWINGS

FIG. 4 depicts a user interface to view and manage cloud-based resource allocations according to some embodiments.

FIG. 5 depicts a user interface to view and manage cloud-based license resource reservations according to some embodiments.

DETAILED DESCRIPTION

The following description is provided to enable any person in the art to make and use the described embodiments. Various modifications, however, will remain readily-apparent to those in the art.

According to some embodiments, software licenses are treated as deployable and elastic cloud resources, similar to resources such as compute, storage, and I/O. As with other cloud resources, a software license may be deployed on an ad-hoc basis, manually or based on demand. Moreover, the cost of software license resources in a deployment may be efficiently incorporated into the cost of the customer's corresponding hosting subscription.

In some embodiments, a number of software licenses, or license capacity, may be reserved by purchasing the licenses via a reservation mechanism. Purchasing software licenses for use in a reservation may provide a corresponding discount to the customer as compared to an ad-hoc purchase of a software license. According to some embodiments, previously-purchased on-premise licenses may be exchanged for full or partial credit toward cloud software licenses to be used in a reservation.

As in the case of a typical cloud resource reservation, software licenses are first provided as needed from the reserved software licenses. Once the reserved software licenses are exhausted, any additional software licenses that are needed may be instantiated and activated on-demand by the cloud service provider. According to some embodiments, a cost for these latter software licenses may be based on usage of the cloud resources which are licensed by the software licenses.

Some embodiments may therefore provide elasticity of resource allocation and facilitate license-compliant operation of a customer's cloud deployment.

Figure 1:
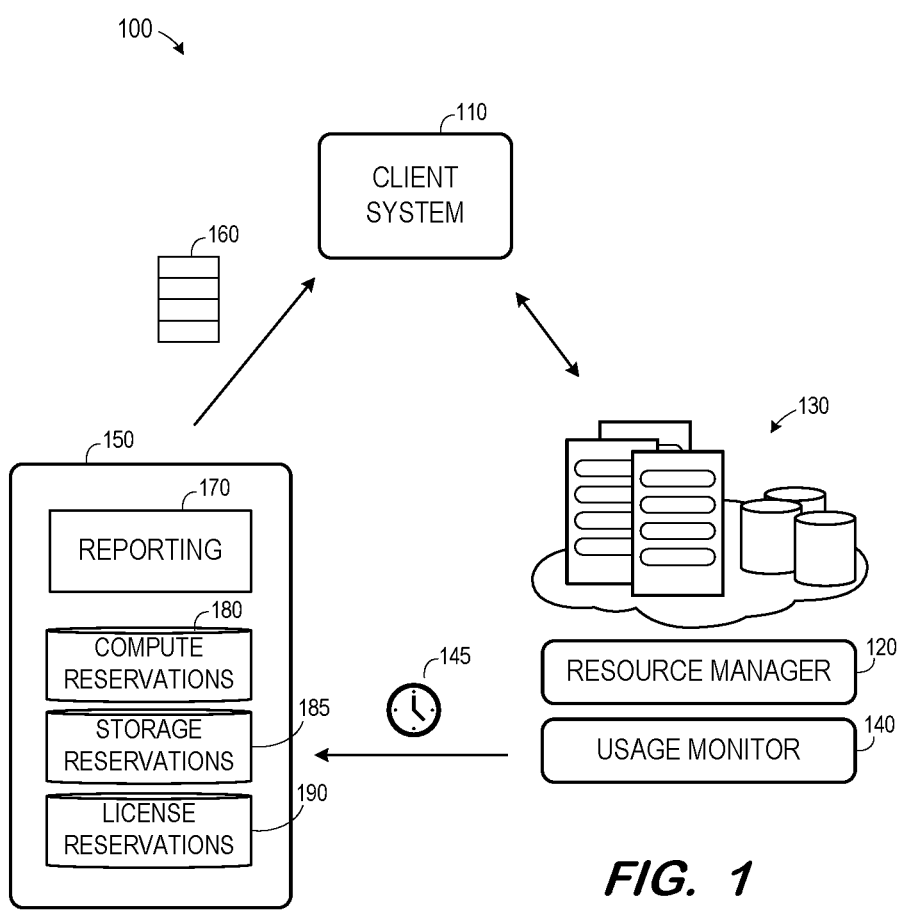
FIG. 1 illustrates an architecture for providing and monitoring on-demand cloud-based resources including licenses according to some embodiments.

Architecture 100 of FIG. 1 is intended to illustrate operation according to some embodiments. Embodiments are not limited to architecture 100 or to the foregoing description thereof.

Architecture 100 includes client system 110. Client system 110 may comprise any standalone or distributed computing system for communicating with resource manager 120 of cloud deployment 130. In some embodiments, client system 110 may comprise a desktop computing system and may be operated by a customer to access an interface provided by resource manager 120 to create, update, and delete cloud-based resources of cloud deployment 130. In some embodiments, the customer establishes a subscription with an organization hosting cloud deployment 130, and the cloud-based resources of cloud deployment 130 are associated with the subscription.

A cloud-based resource is a hosted and manageable item that is available to an external device via the Internet protocol stack. Cloud-based resources may include but are not limited to servers, virtual machines, storage accounts, web apps, databases, virtual networks, software, analytics and intelligence. A customer typically pays only for resources used, which may reduce operating costs and provide scale to cope with increased demand.

Cloud-based resources of cloud deployment 130 may be accessed by the customer, the customer's customers, or any suitable entity. For example, a customer may define compute and storage resources of cloud deployment 130 to provide a publicly-accessible online store. In another example, resources of cloud deployment 130 execute the customer's back office functions.

According to some embodiments, and in response to an instruction from client system 110, resource manager 120 may instantiate a software license resource and associate the software license resource with a customer subscription. A software license resource may be associated with specific resources or groups of resources within a subscription. A software license resource provides the holder of the software license resource (e.g., the customer operating client system 110) with rights to execute software according to the terms of the software license. The software may be executed, for example, by another of the resources (e.g., a virtual machine, a database) associated with the customer subscription.

FIG. 1 also illustrates usage monitor 140. The hosting entity may operate usage monitor to monitor usage of one or more of the resources of cloud deployment 130. Usage monitor 140 may track the total time during which each resource is being used. This total usage time 145 may be transmitted to reporting system 150 of the hosting entity.

Generally, reporting system 150 may operate to generate usage report 160. Usage report 160 may comprise a list of resources associated with a given subscription. Report 160 may also associate each resource (including any software license resources) with a total usage time and a cost calculated based on the total usage time (e.g., =cost_per_hour× total_usage_time_in_hours).

Reporting system 150 may execute reporting code 170 to generate report 160 based on total usage time 145. Generation of report 160 may also be based on resource reservations associated with the given subscription. Reporting system 150 includes data describing compute resource reservations 180, storage resource reservations 185 and software license resource reservations 190. Reservations are not limited to these three types of resources. For example, reporting system 150 may periodically (e.g., monthly) acquire total usage time 145 from usage monitor 140, determine portions of total usage time 145 which are not associated with pre-reserved resources defined by resource reservations 180, 185 and 190, and calculate monthly resource costs associated with the determined portions.

A resource reservation, according to some embodiments, may comprise one or more resources associated with a subscription, and may be billed in advance of usage. For example, a customer may request a reservation of five virtual machines having a particular configuration. The reservation may be associated with a time period such as one year, after which the reservation expires. The customer may pay for the reserved five virtual machines prior to the start of the time period. A total cost of the reservation may be less than the cost of using five non-reserved virtual machines over the course of one year. A reservation may therefore provide cost savings and cost certainty. A reservation may result in increased cost if total usage of the reserved resources over the reservation period is less than expected. Establishment and management of software license resource reservations according to some embodiments will be discussed in detail below.

Figure 2:
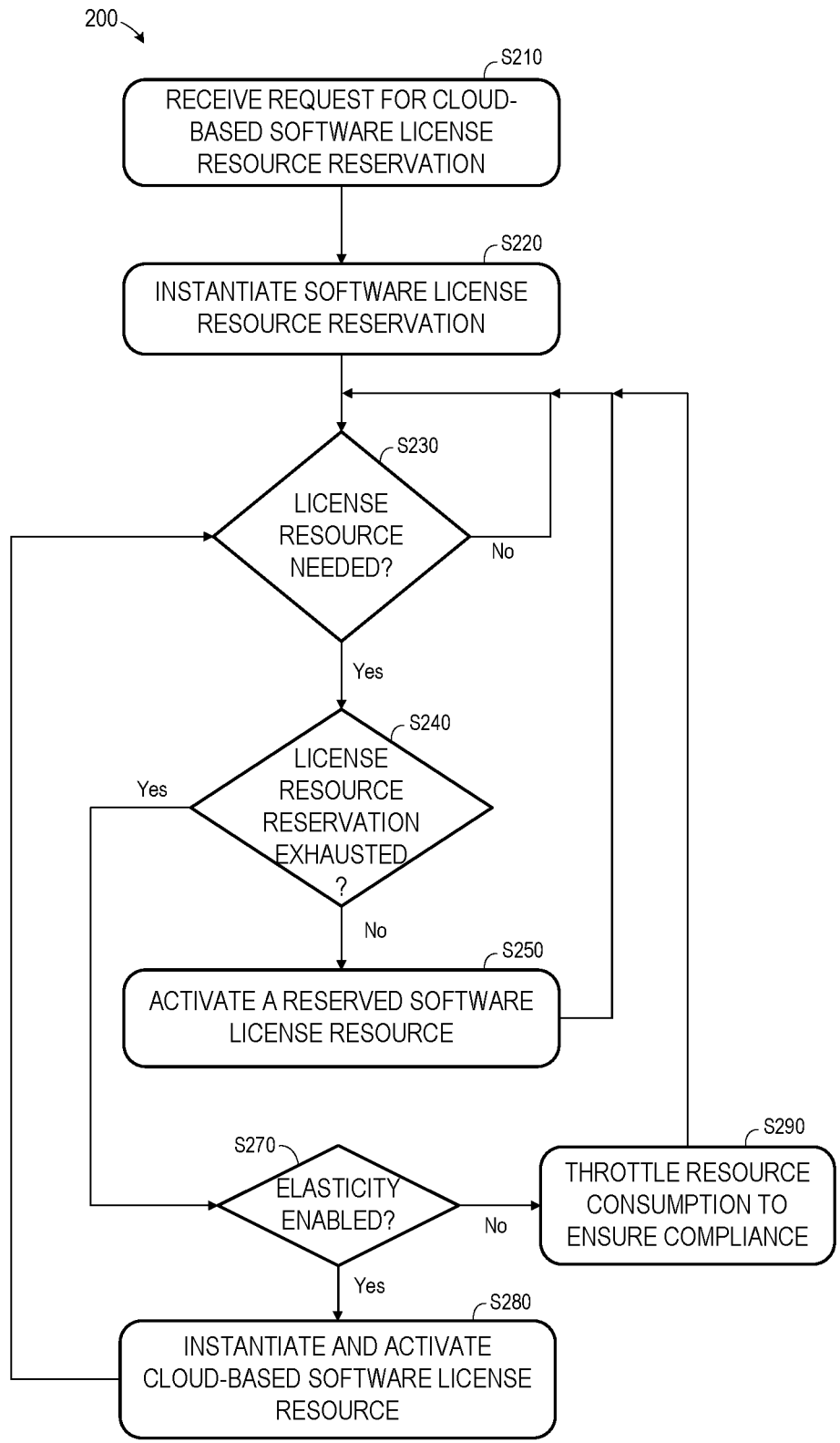
FIG. 2 is a flow diagram of a process to provide cloud-based license resources according to some embodiments.

FIG. 2 comprises a flow diagram of process 200 to provide a software license as a cloud-based resource according to some embodiments. In some embodiments, processing units (e.g., one or more processors, processing cores, processor threads) of a cloud service provider and/or resource manager execute software program code to perform process 200. Process 200 and all other processes mentioned herein may be embodied in processor-executable program code read from one or more of non-transitory computer-readable media, such as a volatile or non-volatile random access memory, a fixed disk drive, a DVD-ROM, a Flash drive, and a magnetic tape, and then stored in a compressed, uncompiled and/or encrypted format. Embodiments are therefore not limited to any specific combination of hardware and software.

Initially, at S210, request is received for a cloud-based software license resource reservation. The request may be received by resource manager 130 from client system 110 via a management and monitoring portal, and may include a request for other cloud-based resources including one or more resources associated with the software license resource (e.g., a resource for which the license resource is required in order to be in compliance). The request may specify, depending upon the functionality of the portal, characteristics of the software license resource such as duration, resource to which the software license resource applies, and total number of software license resources to include in the reservation.

In some implementations, the cost of each software license resource in a reservation is less than the cost of each software license resource if purchased outright. However, limits may be attached to the usage of software license resources of a reservation so as to prevent the software licenses from acting as complete substitutes for full-priced software license resources.

According to some embodiments, the request received at S210 includes a request to exchange previously-purchased software licenses (e.g., on-premise software licenses) for corresponding cloud-based software licenses to be used in the resource reservation. Constraints may be applied as to the types of previously-purchased software licenses which may be exchanged for particular types of cloud-based software licenses. A previously-purchased on-premise license may be exchanged for full or partial credit toward a corresponding cloud-based software license. The request received at S210 may therefore include a request to purchase one or more software licenses and/or a request for credit toward one or more software licenses based on existing software licenses.

Figure 3:
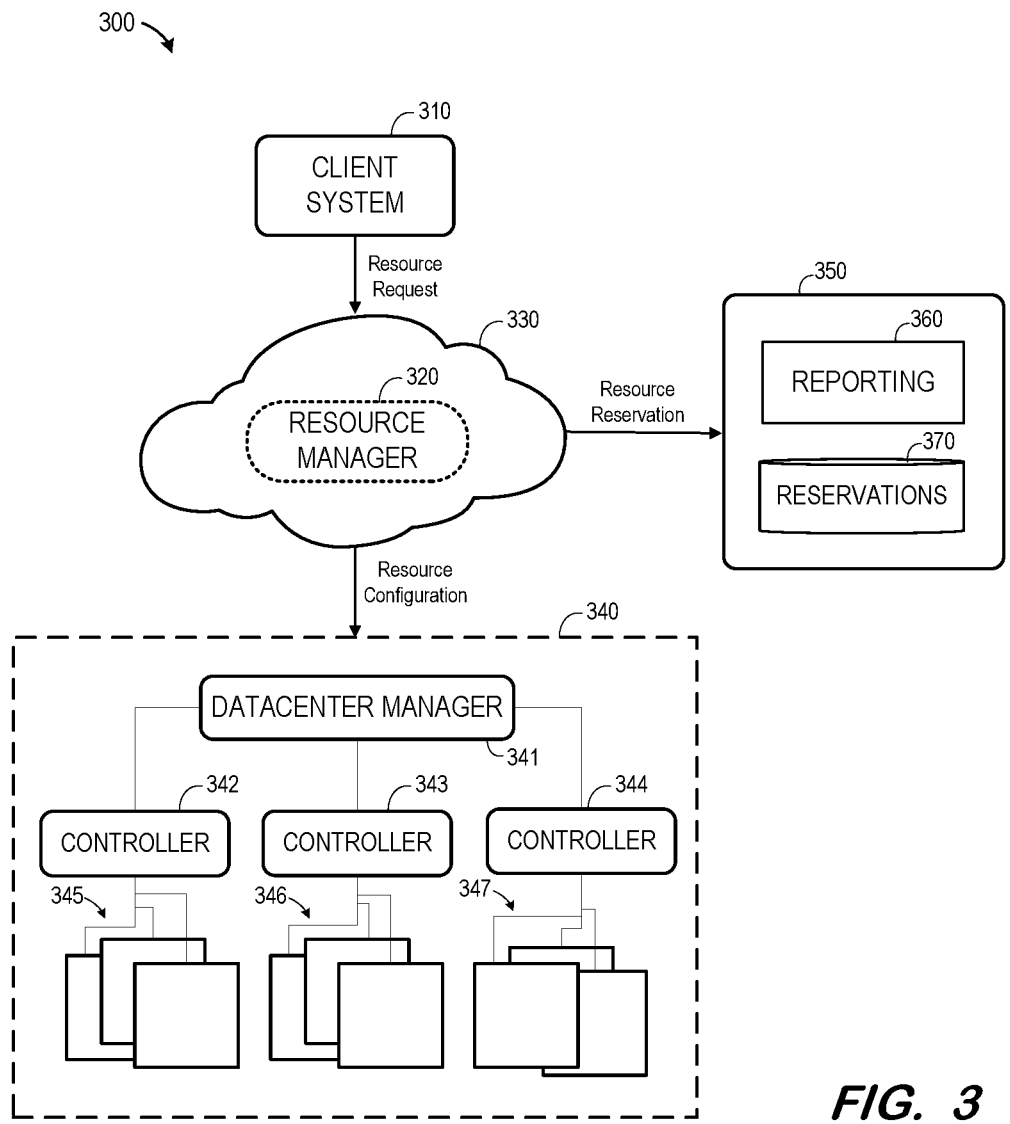
FIG. 3 illustrates an architecture for deploying cloud-based resources including licenses according to some embodiments.

FIG. 3 illustrates architecture 300 for describing process 200 according to some embodiments. Client system 310 requests resources from resource manager 320 located in public cloud 330. The request may specify datacenter resources and architectures, and may include configuration information of any level of specificity. Based on the request, resource manager 320 transmits resource configuration information to datacenter 340.

The requested resources may include compute, storage, I/O and other types of resources. As described herein, the requested resources may also include software licenses. In one example, client system 310 may access a management portal provided by resource manager 320 to request a particular VM resource running a particular operating system, as well as one or more license resources required to run the particular operating system on the particular VM resource.

Figure 4:
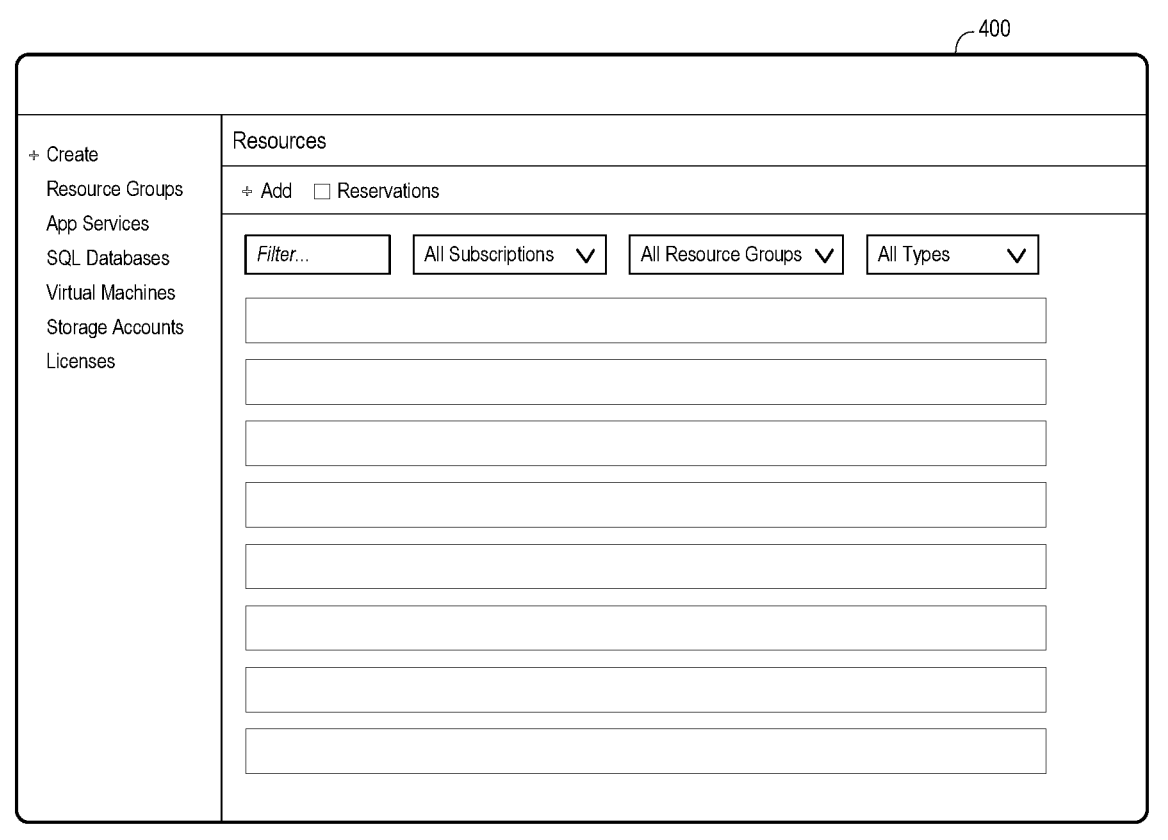

FIG. 4 illustrates user interface 400 to manage cloud-based resources according to some embodiments. User interface 400 may comprise an interface of a management portal of resource manager 320 as described above. User interface 400 may list all resources associated with a customer account, which in turn may include one or more subscriptions. The resources displayed on user interface 400 may be filtered by subscription, resource groups (i.e., a defined set of one or more resources), type, and any other suitable characteristic.

User interface 500 of FIG. 5 may be used to request a software license resource reservation at S210 according to some embodiments. A license reservation may be defined using a name, a type of licensed software (e.g., SQL_Server), a quantity of software license resources to include in the reservation, an expiration date, and an indication of the elasticity of the reservation. License reservation may also specify one or more subscriptions, one or more resources, and one or more resource groups which are to be associated with the license reservation.

As will be described in detail below, reservation elasticity determines whether additional software license resources of the same type may be instantiated and activated as needed. These additional software license resources may be billed to the customer based on usage (i.e., usage of the resources covered by the additional software license resources). User interface 500 may also list currently-registered license resource reservations as shown.

According to some embodiments, the customer may be permitted to use previously-purchased on-premise software licenses within a cloud-based software license resource reservation. In such cases, the management portal may allow the customer to specify a number of on-premise software licenses already owned by the customer and their respective expiration dates. These software licenses may defray the cost of the cloud-based software license resource reservation. For example, each of the already-owned on-premise software licenses may entitle the customer to a discount of the price of one cloud-based software license used by a cloud resource.

After reception of the request at S210, a software license resource reservation is instantiated at S220. In some embodiments, resource manager 320 transmits resource reservation information to reporting system 350 based on the request received at S210. Reporting system 350 then instantiates the software license resource reservation by storing data including details of the software license resource reservation. The details may include but are not limited to the requesting customer account, the scope of software license resources (i.e., covered subscription(s), resource group(s), and/or resource(s)), the software covered by the software license resources, the resource(s) of the customer on which the software executes, a duration of the reservation, and a cost of the reservation to the customer.

Figure 6:
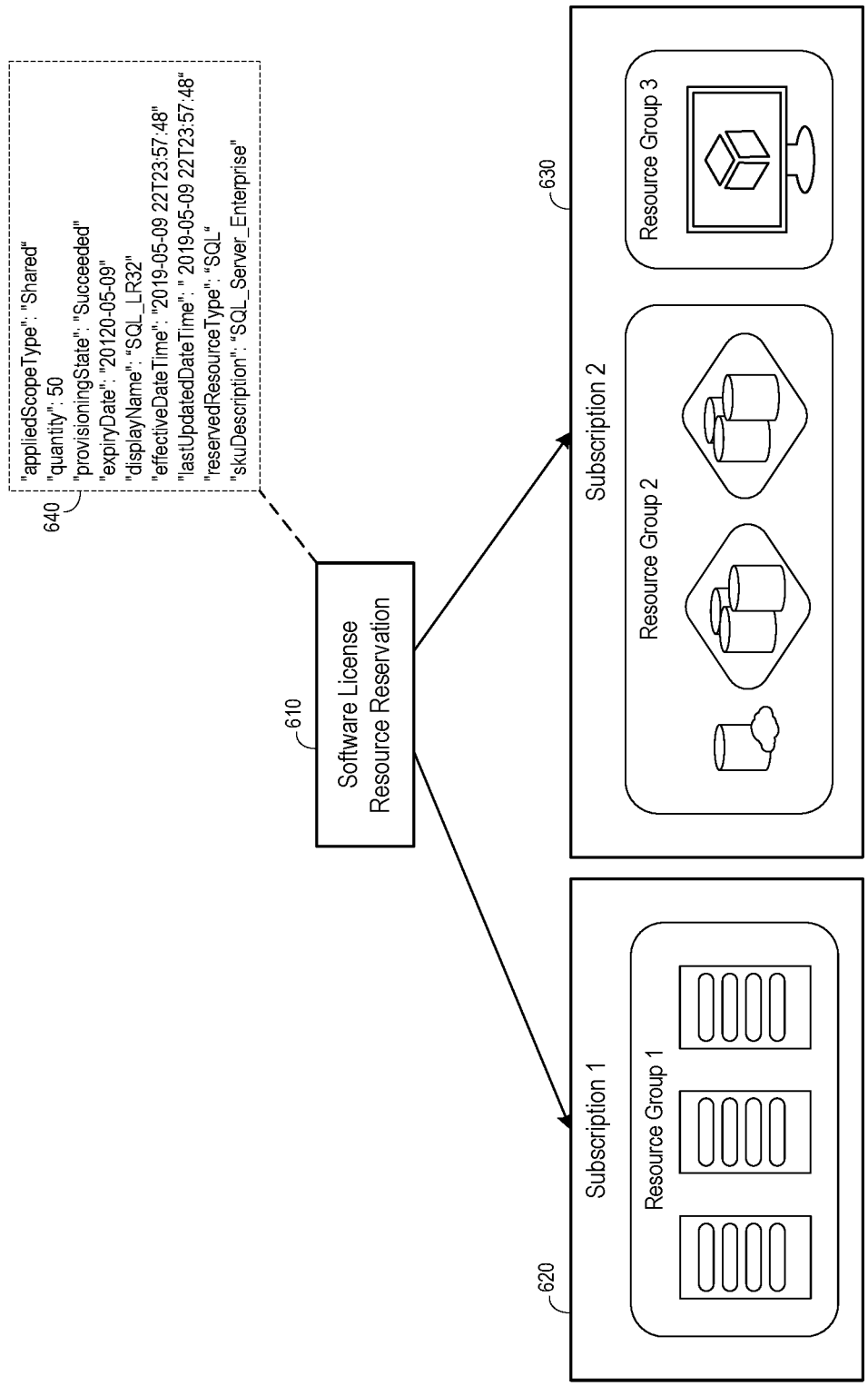
FIG. 6 illustrates allocation of a license reservation to multiple subscriptions according to some embodiments.

FIG. 6 illustrates instantiation of a software license resource reservation according to some embodiments. Example software license resource reservation 610 is associated with subscription 620 and subscription 630 of a customer account. Subscription 620 includes a single resource group and subscription 630 includes two resources groups. Software license resource reservation 610 may be used to provide needed software licenses for any resources of subscription 620 and subscription 630.

Instantiation data 640 describes characteristics of software license resource reservation 610 and may be stored by reporting system 350 at S220. The characteristics include an appliedScopeType of "Shared", indicating that the software license resources of software license resource reservation 610 may be applied to any resources of the customer account. Data 640 also indicates that reservation 610 includes fifty software license resources.

Figure 7:
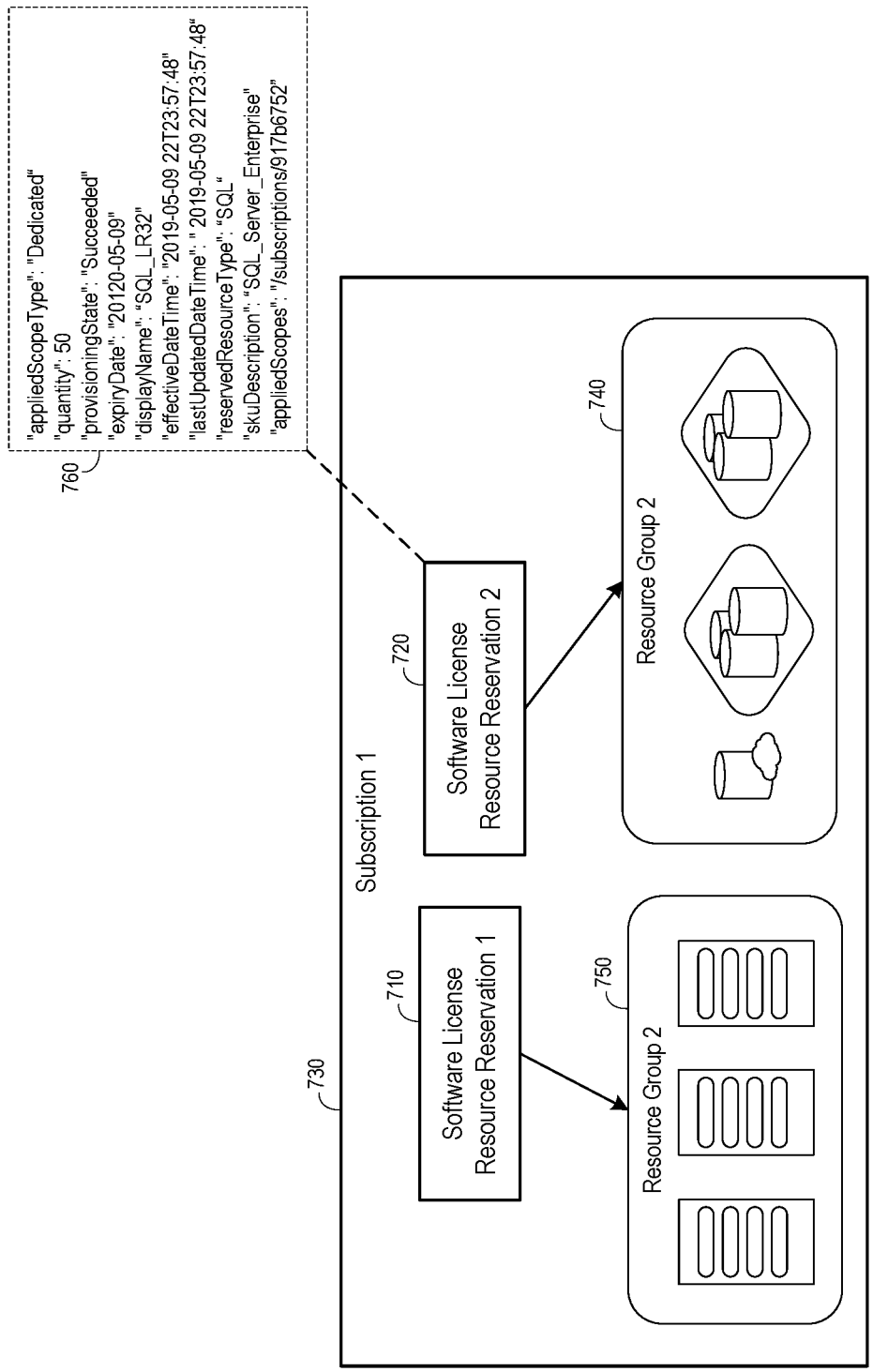
FIG. 7 illustrates allocation of multiple license reservations to multiple resource groups according to some embodiments.

FIG. 7 shows software license resource reservation 710 and software license resource reservation 720, both of which are associated with single subscription 730 of a customer account. The software license resources of software license resource reservations 710 and 720 may not be applied to resources associated with any other subscriptions of the customer account. Moreover, each of software license resource reservations 710 and 720 are associated with a dedicated resource group. The software licenses of software license resource reservation 710 may be applied to the resources of resource group 750 and the software licenses of software license resource reservation 720 may be applied to the resources of resource group 740 according to some embodiments.

Instantiation data 760 describes characteristics of software license resource reservation 720. The characteristics include an appliedScopeType of "Dedicated", indicating that the software license resources of software license resource reservation 760 may be applied to resources of a specified resource scope. This scope is defined by the appliedScopes parameter, which in the present example identifies resource group 740 of subscription 720.

S220 may also include transmission of resource configuration information from resource manager 320 to datacenter 340. Datacenter 340 configures its resources based on the received resource configuration information to instantiate the requested resources. For example, datacenter manager 341 may transmit information to controllers 342, 343 and 344 to instantiate a number of virtual machines having various characteristics within server clusters 345, 346 and/or 347. Each virtual machine may execute its own operating system which may be the same or different than the operating system executed on any other virtual machine. Each virtual machine may run one or more applications on its operating system. Each server node of clusters 345, 346 and 347 also includes storage (e.g., hard disk drives) and memory (e.g., RAM) that can be accessed and used by the node's processors and virtual machines. In other architectures, some server nodes may be dedicated to storage and while other nodes are dedicated to executing virtual machines.

After S220, it is assumed that the customer uses the instantiated cloud-based resources for their intended processing purposes. Flow then cycles at S230 until it is determined that a software license resource is needed. In some embodiments, the determination at S230 may be executed by resource manager 230. In this regard, since resource manager 230 may centrally-manage the software license resources and other resources, resource manager 230 may maintain a count of active software license resources of the reservation and apply logic to determine whether the active software license resources of the customer are sufficient in view of the other resources currently deployed by the customer. Such logic may be based on the subscriptions and resource groups with which the resources are associated, and the specified scopes of any instantiated license resource reservations associated with the customer account.

If the active software license resources of the customer are not sufficient, it is determined whether the applicable license resource reservation is exhausted at S240. In other words, it is determined at S240 whether all of the software license resources of the applicable license resource reservation have already been activated for use. If not, one of the cloud-based license resources of the reservation is activated at S250. Activation may comprise incrementing the count of active license resources of the reservation. Flow then returns to S230.

Flow proceeds to S270 if it is determined at S240 that the applicable license resource reservation is exhausted. At S270, it is determined whether the license resource reservation is to be considered elastic. In this regard, elasticity is a property which allows automatic instantiation of a software license resource corresponding to a license reservation as needed. According to some embodiments, and as described with respect to FIG. 5, a customer may define a software license resource reservation as elastic during the request for the software license resource reservation.

If elasticity has been enabled, flow proceeds to S280 to instantiate and activate a cloud-based software license resource. If it was determined at S230 that more than one license resource is needed, then the more than one license resources are instantiated and activated at S280.

According to some embodiments, the software license resources of S280 are of a different type than the software license resources of the resource reservation. For example, the software license resources of the resource reservation may be associated with a validity period, (e.g., 1 year) and a fee associated with these software license resources may be based on the validity period (e.g., $X per year per license). In some scenarios, the fee is billed in advance of the validity period.

On the other hand, the software license resources of S280 may be billed to the customer based on license usage. The usage of a software license resource may be represented by the monitored usage of the cloud-based resources which are associated with the software license resource. For example, if a software license resource activated at S280 covers software executed by a server resource, the corresponding license usage is equal to the monitored usage of the server resource.

A reporting system such as reporting system 150 or reporting system 350 may track both the software license reservations and the software license resources activated at S280. Accordingly, such a reporting system may use usage data to determine periodic (e.g., monthly) costs associated with software license resources activated at S280 as described above. No periodic costs are determined for software license resources of the reservation, regardless of the usage data associated with cloud-based resources covered by such software license resources.

If it is determined at S270 that elasticity has not been enabled, resource consumption may be throttled at S290. Resource consumption is throttled, or reduced, at S290 to ensure compliance with software licensing requirements. Specifically, the change to the deployment which resulted in the need for another license resource at S230 may be rolled back (if the change has already been made) or aborted (if the change has not yet taken effect) at S290. Throttling resource consumption may provide more certainty regarding expenses than scenarios which allow elasticity, to the possible detriment of performance. Flow may then return to S230 from S290, to support instantiation and activation of needed license resources at S280 if elasticity is enabled at a later time.

Figure 8:
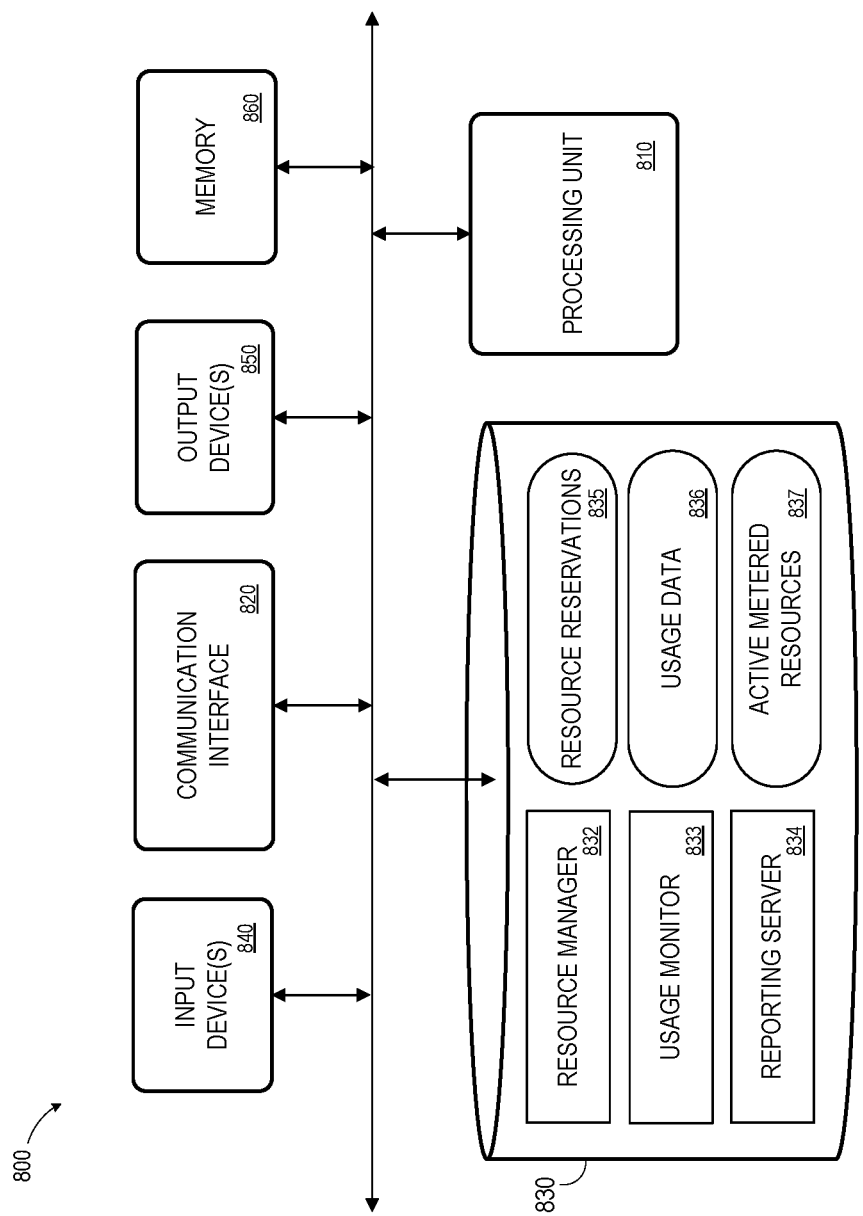
FIG. 8 is a block diagram of a computing system to deploy cloud-based license resources according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of resource manager 124, usage monitor 140 and reporting server 150 in some embodiments. Apparatus 800 may include other unshown elements according to some embodiments.

Apparatus 800 includes processing unit 810 operatively coupled to communication device 820, data storage device 830, one or more input devices 840, one or more output devices 850 and memory 860. Communication interface 820 may facilitate communication with a network and ultimately with client systems as described above. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display and a speaker.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory. Data storage device 830 may be implemented using distributed storage systems.

Resource manager 832, usage monitor 833 and reporting server 834 may comprise program code executable by processing unit 810 to cause apparatus 800 to perform any one or more of the processes described herein. Embodiments are not limited to execution of these processes by a single apparatus. For example, the processes attributed to a resource manager, a usage monitor and a reporting server herein may be executed by one or more nodes of a distributed computing system.

Resource reservations 835 may define resource reservations for one or more customer accounts as described herein. Usage data 836 may associate usage information such as usage hours with deployed resources of various customer accounts. Active metered resources 837 may specify resources associated with customer accounts and which should be billed to the customer accounts based on usage. For example, software license resources activated at S280 of process 200 may be represented in active metered resources 837. Data storage device 830 may also store data and other program code for providing additional functionality and/or which are necessary for operation of apparatus 800, such as device drivers, operating system files, etc.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
    a memory storing processor-executable process steps;
    a processing unit to execute the processor-executable process steps to:
        associate a first plurality of software licenses of a first type with a first plurality of cloud-based resources;
        determine a first number of the first plurality of software licenses to activate based on the first plurality of cloud-based resources;
        activate the first number of the first plurality of software licenses;
        monitor usage of the first plurality of cloud-based resources;
        determine, based on the monitored usage, a second one or more cloud-based resources to add to the first plurality of cloud-based resources;
        in response to the determination of the second one or more cloud-based resources, determine a second number of the first plurality of software licenses to activate based on the second one or more cloud-based resources;
        determine whether a number of inactive software licenses of the first plurality of software licenses is less than the second number;
        in response to a determination that the number of inactive software licenses of the first plurality of software licenses is less than the second number:
            determine whether automatic license resource elasticity is enabled for the first plurality of software licenses by accessing a license reservation for the first plurality of software licenses that includes an indicator of whether automatic license resource elasticity is enabled for the first plurality of software licenses, wherein the license reservation is instantiated in response to receiving a request generated by a user via interaction with a user interface and wherein the user interface includes an element by which a user can indicate whether automatic license resource elasticity is enabled for the first plurality of software licenses; and
            in response to a determination that automatic license resource elasticity is enabled for the first plurality of software licenses, activate one or more software licenses of a second type and associate the one or more software licenses of the second type with the second one or more cloud-based resources.

2. A system according to claim 1, wherein the first type of software license is associated with a validity period, and a first fee associated with the first type of software license is based on the validity period, and
    wherein a second fee associated with the second type of software license is based on usage of the second type of software license.

3. A system according to claim 1, the processing unit to execute the processor-executable process steps to:
    in response to a determination that automatic license resource elasticity is not enabled for the first plurality of software licenses, determine to not add the second one or more cloud-based resources to the first plurality of cloud-based resources.

4. The system of claim 1, wherein the software licenses of the first type comprise reserved software licenses and the software licenses of the second type comprise on-demand software licenses.

5. The system of claim 1, wherein the cloud-based resources comprise one or more of servers, virtual machines, storage accounts, web applications, databases, virtual networks, software, or analytics and intelligence.

6. A method comprising:
    associating a first plurality of software licenses of a first type with a first subscription, the first subscription associated with a first plurality of cloud-based resources;
    determining a first number of the first plurality of software licenses to activate based on the types of the first plurality of cloud-based resources;
    activating the first number of the first plurality of software licenses;
    monitoring usage of the first plurality of cloud-based resources;
    determining, based on the monitored usage, a second one or more cloud-based resources to associate with the first subscription;
    in response to determining the second one or more cloud-based resources, determining a second number of the first plurality of software licenses to activate based on the types of the second one or more cloud-based resources;
    determining whether a number of inactive software licenses of the first plurality of software licenses is less than the second number; and
    in response to a determination that the number of inactive software license of the first plurality of software licenses is less than the second number:
        determining whether automatic license resource elasticity is enabled for the first plurality of software licenses by accessing a license reservation for the first plurality of software licenses that includes an indicator of whether automatic license resource elasticity is enabled for the first plurality of software licenses, wherein the license reservation is instantiated in response to receiving a request generated by a user via interaction with a user interface, wherein the user interface includes an element by which a user can indicate whether automatic license resource elasticity is enabled for the first plurality of software licenses; and
        in response to a determination that automatic license resource elasticity is enabled for the first plurality of software licenses, activating one or more software licenses of a second type and associating the second one or more cloud-based resources with the first subscription.

7. A method according to claim 6, wherein the first type of software license is associated with a validity period, and a first fee associated with the first type of software license is based on the validity period, and
    wherein a second fee associated with the second type of software license is based on usage of the second type of software license.

8. A method according to claim 6, further comprising:
in response to a determination that automatic license resource elasticity is not enabled for the first plurality of software licenses, determining to not associate the second one or more cloud-based resources with the first subscription.

9. A method according to claim 8, wherein the first type of software license is associated with a validity period, and a first fee associated with the first type of software license is based on the validity period, and
wherein a second fee associated with the second type of software license is based on usage of the second type of software license.

10. The method of claim 6, wherein the software licenses of the first type comprise reserved software licenses and the software licenses of the second type comprise on-demand software licenses.

11. A system comprising:
a set of cloud-based resources;
a resource manager to:
receive an instruction to associate a first plurality of software licenses of a first type with a first subscription, the first subscription associated with a first plurality of the set of cloud-based resources;
determine a first number of the first plurality of software licenses to activate based on the types of the first plurality of the set of cloud-based resources; and
activate the first number of the first plurality of software licenses; and
a usage monitor to:
monitor usage of the first plurality of the set of cloud-based resources;
wherein the resource manager is further to:
determine, based on the monitored usage, a second plurality of the set of cloud-based resources to associate with the first subscription;
in response to determining the second plurality, determine a second number of the first plurality of software licenses to activate based on the second plurality of the set of cloud-based resources;
determine whether a number of inactive software licenses of the first plurality of software licenses is less than the second number;
in response to a determination that the number of inactive software licenses of the first plurality of software licenses is less than the second number:
determine whether automatic license resource elasticity is enabled for the first plurality of software licenses by accessing a license reservation for the first plurality of software licenses that includes an indicator of whether automatic license resource elasticity is enabled for the first plurality of software licenses, wherein the license reservation is instantiated in response to receiving a request generated by a user via interaction with a user interface and wherein the user interface includes an element by which a user can indicate whether automatic license resource elasticity is enabled for the first plurality of software licenses; and
in response to a determination that automatic license resource elasticity is enabled for the first plurality of software licenses, activate one or more software licenses of a second type and associate the second plurality of the set of cloud-based resources with the first subscription.

12. A system according to claim 11, wherein the first type of software license is associated with a validity period, and a first fee associated with the first type of software license is based on the validity period, and
wherein a second fee associated with the second type of software license is based on usage of the second type of software license.

13. A system according to claim 11,
the resource manager further to:
in response to a determination that automatic license resource elasticity is not enabled for the first plurality of software licenses, determine to not associate the second plurality of the set of cloud-based resources with the first subscription.

14. The system of claim 11, wherein the software licenses of the first type comprise reserved software licenses and the software licenses of the second type comprise on-demand software licenses.

* * * * *